(12) United States Patent
Wagner et al.

(10) Patent No.: US 7,302,074 B2
(45) Date of Patent: Nov. 27, 2007

(54) RECEIVER

(75) Inventors: Georg Wagner, Vienna (AT); Daniel Huber, Vienna (AT)

(73) Assignee: Spirit Design Hubner, Christoffer, Wagner OEG, Vienna (AT)

( * ) Notice: Subject to any disclaimer, the term of this patent is extended or adjusted under 35 U.S.C. 154(b) by 0 days.

(21) Appl. No.: 10/331,178

(22) Filed: Dec. 27, 2002

(65) Prior Publication Data

US 2003/0147545 A1    Aug. 7, 2003

Related U.S. Application Data

(63) Continuation of application No. PCT/AT01/00214, filed on Jul. 2, 2001.

(30) Foreign Application Priority Data

Jun. 30, 2000    (AT) .............................. A 1132/2000

(51) Int. Cl.
  *H04R 25/00*    (2006.01)
(52) U.S. Cl. .................. 381/381; 381/370; 381/374
(58) Field of Classification Search ................ 381/238, 381/330, 370–371, 374, 375, 381, 382, 327; 379/430
  See application file for complete search history.

(56) References Cited

U.S. PATENT DOCUMENTS

| 3,862,378 A | 1/1975 | Norris |
| 4,932,052 A | 6/1990 | Lo |
| 5,134,655 A | 7/1992 | Jensen |
| 5,790,683 A | 8/1998 | Salzani |
| 5,881,161 A * | 3/1999 | Liu ............................ 381/381 |
| 5,903,644 A | 5/1999 | Hirtl et al. |

(Continued)

FOREIGN PATENT DOCUMENTS

CN    1256607 A    6/2000

(Continued)

*Primary Examiner*—Suhan Ni
(74) *Attorney, Agent, or Firm*—Thomas R. Vigil

(57) ABSTRACT

The listening device or receiver is connected via an interface to a device for the output of audio signals and comprises a listening capsule (7) which is arranged in a housing (2), and a retaining arm (3) for detachable connection to the ear of the user. The retaining arm (3) is arranged on the housing (2) and is mounted in an outward direction therefrom. In the area of the helix of the ear, the retaining arm engages with the ear from the rear with the aid of an area (3*b*) extending back towards the housing. The area (3*b*) of the arm (3) which engages with the helix from the rear has an end area which is disposed on the rear side of the ear when the arm is attached. The retaining arm (3) is deformable and the housing (2) has a bearing surface for the ear (10) on the side facing the outer side of the ear. When attached, the arm (3) is pressed at least partially against the rear side of the ear and the listening device (1) with the ear-bearing surface (10) pressed at least partially, against the outer side of the ear, whereby the listening capsule (7) is arranged close to the horn and/or to the entrance of the external auditory passage of the ear and the ear-bearing surface (10) and the listening capsule (7) are placed at a distance from the entrance to the external auditory passage.

26 Claims, 5 Drawing Sheets

U.S. PATENT DOCUMENTS 6,038,329 A    3/2000  Lee

FOREIGN PATENT DOCUMENTS

| EP | 396300 A2 | 7/1990 |
| EP | 690654 A2 | 3/1996 |
| JP | 59-61689 | 4/1984 |
| JP | 7-39195 | 7/1995 |

* cited by examiner

RECEIVER

CROSS-REFERENCE TO RELATED APPLICATIONS

This application is a continuation of PCT/AT01/00214, filed Jul. 2, 2001, which claims the benefit of priority from Austrian application A 1132/2000 filed Jun. 30, 2000.

BACKGROUND OF THE INVENTION

1. Field of the Invention

The present invention relates to a receiver or listening device connectable with at least one apparatus adapted to at least output audio signals via at least one interface and provided with at least one ear piece accommodated in a housing and with one retaining strap for releasable attachment to the user's ear, the strap being disposed on the housing extending away therefrom and a portion of said strap, which is oriented back toward the housing, passing behind the ear in a region of the helix, the region of the strap passing behind the helix being provided with an end region abutting the back side of the ear when attached.

2. Description of the Prior Art

Such receivers are being used for example in connection with mobile phones or computers and are in most cases provided with a microphone. Such apparatuses are generally termed "headset" and are connectable to devices for in-and outputting audio signals such as mobile phones or computers. In cooperation with a mobile phone, they make it possible for the user to make calls without constantly using his hands. For this purpose, the headset is in most cases provided with a loudspeaker and a microphone and is electrically connected with the mobile phone via a cord for example. In computers, such above mentioned headsets are used for example in connection with what is termed speech recognition software which involves that, on the one side, speech is entered by a user into the computer via the microphone of the headset, the computer converting this speech in executable commands or in text and that, on the other side, sounds, spoken sentences, music and so on generated by the computer are outputted via the loudspeaker of the headset.

A great variety of different types of such headsets being designed and configured depending on the intended purpose of utilization are commercially available. Such headsets are widely used that consist of a loudspeaker only which is configured in such a manner that it is placed in the external ear in the region of the pinna or exterior auditory canal where it is quite well retained—in the same way as headphones for portable music players are being used. The headphone is connectable to at least one mobile phone by means of a cord via a corresponding interface, the microphone is carried by the cord and is located close to the user's mouth so that speech may be entered. This low-cost embodiment of a headset, which has therefore been widely used, has several disadvantages though. Many people think that it is extremely unhygienic to place the loudspeaker in the auditory canal or in the pinna of the ear so that a headset is generally used by one person only. Further, the headphone is only then well retained in the ear when it is introduced firmly and deeply into the pinna or the exterior auditory canal which increases the uncomfortable feeling of a foreign body being located in the ear.

In another known variant, the headset is held to the user's head by means of a strap that is connected at one end to a loudspeaker, said strap passing over the head and extending from one ear to the region of the second ear. An extension, which carries at its outer ends a microphone in proximity to the mouth, is disposed on the loudspeaker. Such headsets are widely used in connection with voice software for computers and are mainly utilized in telephone exchanges and directory enquiries centers in which the users wear the headsets continuously for a long time. For mobile use however, more specifically in hands-free operation of mobile phones for example, these realizations are suited for limited utilization only since they are unwieldy, quite heavy and difficult to stow after use.

A headset configured for specific use with mobile phones has been described in WO 95/15044. This document discloses a headset consisting of a loudspeaker and of a microphone disposed at one end of an extension which is fastened to a main part receiving the loudspeaker. The headset is provided with a U-shaped strap disposed on the main part. The U-shaped strap consists of two legs that are joined together by means of an upper joining piece. In the fastened condition, the joining piece of the headset rests on the ear, in the uppermost region thereof where it is attached to the head. For counterbalance and for a stable fixation at the ear, the headset is provided with a weight mounted at the end of that leg that is not connected to the housing, the other leg is connected to the main part by its lower end.

The headset is thus held to the user's ear by its own weight, an additional weight being disposed at the free leg in an effort to counterbalance the weight of the extension carrying the microphone and generally projecting in proximity to the mouth, or the leg being provided with a corresponding own weight. After a certain wearing period, the weight or load of the headset results in unpleasant sore places in the resting area of the joining piece between the two legs in the upper region of the ear, which is even further increased by the weight the one leg is to be provided with.

Furthermore, the headset presented is firmly and fittingly held to the ear only when the user is in an almost upright position, which is only given when the user is standing or sitting, though. Fast movements, by contrast, may easily cause the headset to slip out of place.

U.S. Pat. No. 4,932,052 A describes a combined headset-handset that is, on the one hand, fastenable to a user's ear, and that, on the other hand, is sized and configured in such a manner that it may also be used as a handset. The headset-handset has a housing that receives a loudspeaker. The housing is shaped to fit in the ear in the region of the auditory canal or of the pinna. For attachment to the ear, the headset is provided with a crossbar that is pressed against the back side of the ear, in that region in which the ear is attached to the head. To adapt to various ear sizes, the cross bar is slidably arranged relative to the housing, the cross bar being fixed in the desired position relative to the housing by means of a spring.

Besides the fact that, as it is used as a handset, this headset-handset is a quite large and heavy product, it has the further disadvantage that it is complicated to apply and fixate to the ear. As slidable parts and a spring for fixating the cross bar relative to the housing are being used, the headset disclosed in U.S. Pat. No. 4,932,052 A is comparatively expensive to manufacture and is exposed to high wear so that it is prone to maintenance. For a good fixation of the headset to the ear it is furthermore necessary to introduce the housing accommodating the loudspeaker quite firmly into the ear in the region of the auditory canal or of the pinna and to press firmly the cross bar against the back side of the ear, which as a rule leads to sore places in the ear regions mentioned, more specifically after a long wearing time.

BRIEF SUMMARY OF THE INVENTION

It is an object of the invention to suggest a receiver adapted for easy, uncomplicated releasable fixation to an external ear of a user.

It is a further object of the invention to provide a receiver that is easy to construct.

Eventually, it is also an object of the invention to suggest a receiver that is very convenient to wear and that may be securely worn for a long period of time without the user experiencing typical signs of discomfort such as a sore ear.

These objects are achieved by means of a receiver of the type mentioned herein above in which, according to the invention, the retaining strap is deformable and the housing is provided with an ear resting area on the side thereof that faces the exterior of the ear, the strap, when fastened, being at least partially pressed against the back side of the ear and the ear resting area of the receiver being at least partially pressed against the exterior of the ear in such a manner that the ear piece is disposed in proximity to the pinna and/or the aperture of the auditory canal, the ear resting area and the ear piece being held apart from the aperture of the auditory canal.

The receiver in accordance with the invention may be readily fastened to the ear since the strap is deformable in such a way that the user may form it, prior to putting it on, in such a manner that the backward extending portion of the strap may be readily passed behind the ear. The backward extending portion of the strap may for example be parted from the housing of the receiver and be brought behind the ear. At the same time, the housing is brought into a position at the external ear that is convenient for the user, the ear piece being brought into proximity of the pinna of the ear and of the aperture of the auditory canal so as to provide good audibility. It is thereby not necessary to introduce the ear piece into the aperture of the auditory canal so that unpleasant sore places are prevented and it can be worn comfortably for a long time.

The receiver is particularly well held when the strap is elastically deformable. In this case, when the user lets go the parted strap, it is on the one side partially pressed against the back side of the ear, on the other side it presses the housing of the ear resting area of the headset against the external ear, the pressure being well distributed thanks to the flat configuration of the ear resting area on the one side and to the headset abutting quite insensitive areas of the ear on the other side. In this case again, it is of course not necessary to introduce the ear piece into the aperture of the auditory canal for providing a good fit of the receiver at the ear.

In order to provide a quite large resting area and reliably prevent the ear piece from penetrating into the pinna or into the exterior auditory canal it is advantageous when the area extends beyond the ear piece.

In an aesthetic and easy to manufacture embodiment of the invention the strap is C-shaped.

The receiver in accordance with the invention is particularly comfortable to wear for a user when an adapter, which is provided with a contour that abuts on the back side of the ear, is disposed at that end of the strap that passes behind the helix; it is thereby particularly advisable to have the contour of the adapter, which cooperates with the back side of the ear, substantially conforming to the shape of the ear's back side. The adapter causes the pressure generated by the strap and exerted onto the back side of the ear to be distributed evenly so that sore places are reliably prevented. The adapter also permits to keep it from slipping in an upward or downward direction.

In an advantageous embodiment, the adapter and the strap are made in one piece, the adapter substantially constituting a broadening of the strap.

The receiver is particularly comfortable to wear when the adapter is provided with a rubber-like covering.

The receiver is particularly well held when it is provided, in a rear region of the ear resting area facing the strap, with a prominence that abuts on a rear region of the pinna substantially facing the antihelix or on that region of the pinna that merges into the antihelix when the receiver is fastened since with this prominence slipping in a backward direction is excluded.

It is convenient for the user when the prominence is provided with a substantially rounded contour that imitates the shape of the pinna.

Appropriately, the prominence is configured integral with the ear piece.

For its use with mobile phones for example, the receiver must be provided with at least one microphone.

In a tested embodiment, the at least one microphone is disposed in a front region of the receiver turned away from the strap so that the microphone is directed toward the user's mouth.

The microphone may be readily brought into proximity of the mouth when the receiver is provided, in a front region turned away from the strap, with an extendable microphone arm receiving, in the front region thereof, the at least one microphone.

The microphone may be brought into particularly close proximity of the mouth when the microphone arm is telescopable.

In order to prevent the receiver from abutting the sensitive tragus of the ear and to assist the headset in supporting oscillations during walking or running for example, it is provided, in a front region turned away from the ear, with a supporting surface area for supporting the receiver in a region of the head located immediately in front of the ear.

The receiver is comfortable to wear when the supporting surface area is at least in parts provided with a rubber-like covering.

The receiver may be used on either ear when it is configured symmetrical about a longitudinal axis without the receiver having to be additionally manipulated when being placed from one ear onto the other. In a characteristic embodiment, the housing has a substantially triangular shape viewed from the side, which shape is characterized by being an isosceles or an equilateral triangle.

In a comfortable to wear embodiment of the receiver of the invention provided with an attractive appearance the sides of the triangle are substantially arcuate.

Further, this embodiment is provided with rounded angles.

For easy operation of the receiver, it is advantageous when an actuation element for answering and/or making calls is provided on the side turned away from the ear.

It is furthermore advisable to connect the actuation element to the extendable microphone arm through a mechanism disposed within the housing in such a manner that the arm is moved from its retracted into an extended position upon actuation of said element.

In a comfortable to wear, long-life embodiment, the ear resting area is configured as a cover for the underside of the housing and is releasably fastenable thereon.

It is thereby advantageous when the cover is made from a rubber-like material. Another advantage is further obtained when the cover made from rubber and the rubber covering for the supporting surface area are made in one piece.

BRIEF DESCRIPTION OF THE SEVERAL VIEWS OF THE DRAWINGS

The invention will be described in closer detail hereinafter with reference to the drawing in which.

DETAILED DESCRIPTION OF THE INVENTION

Figure 1:
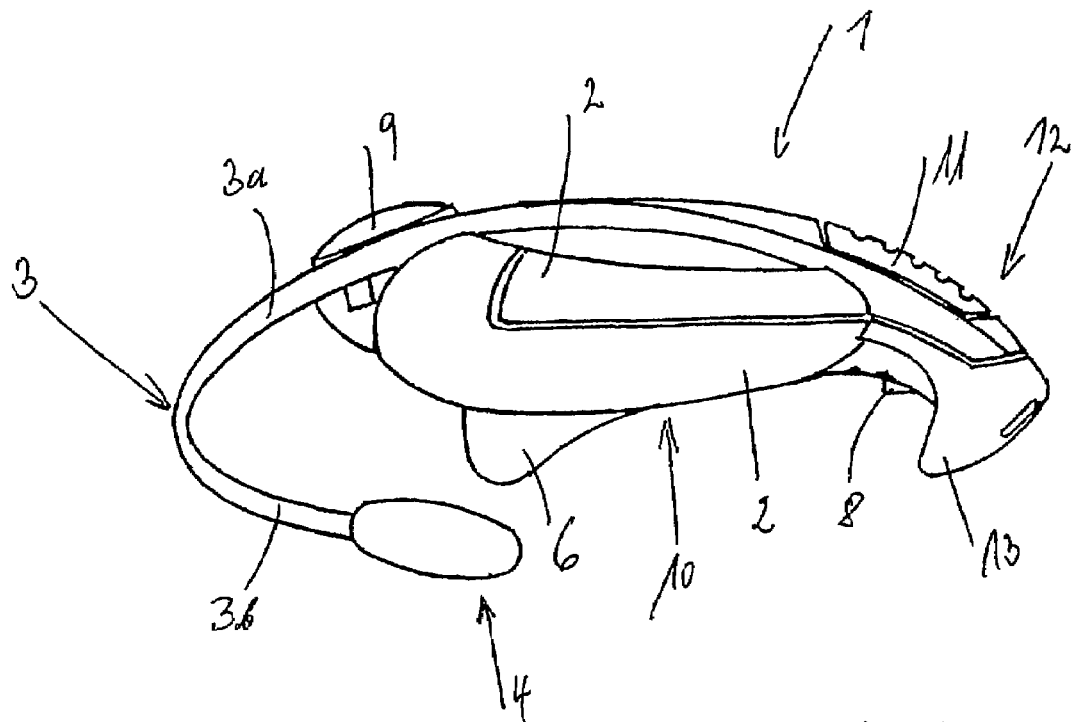
FIG. 1 is a bottom view or a top view of the receiver in accordance with the invention.
Figure 2:
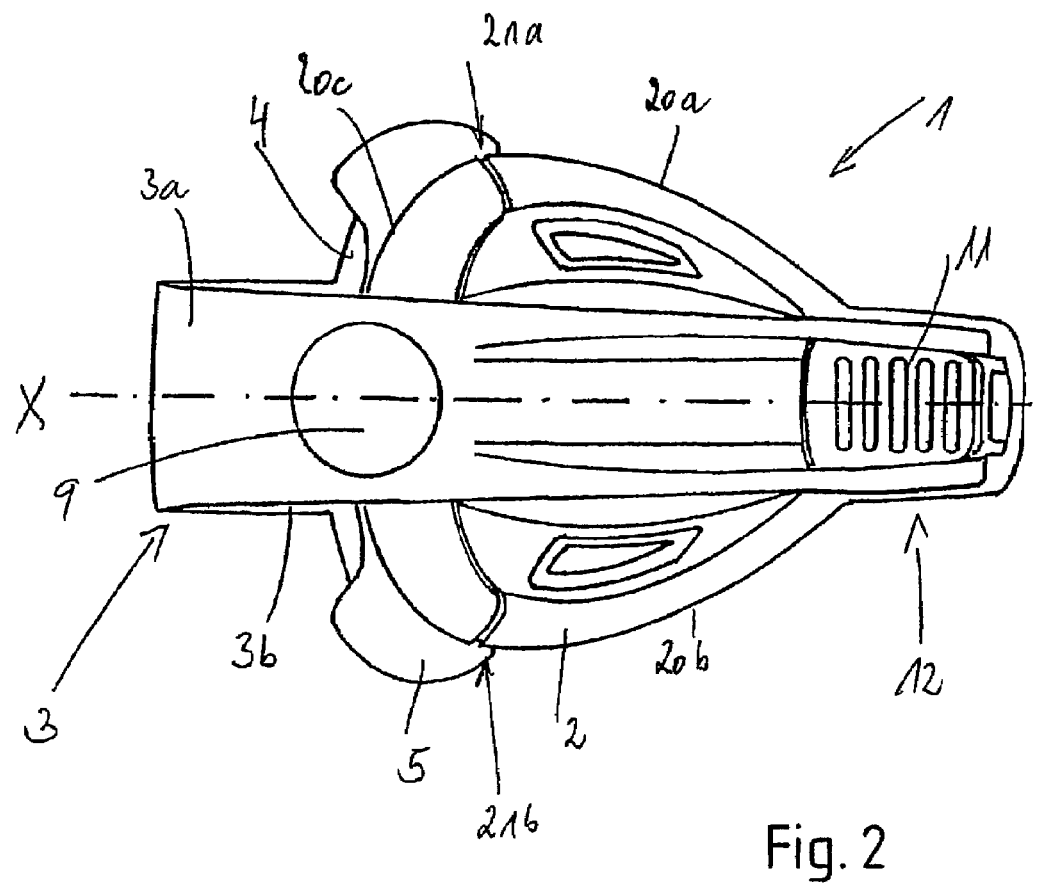
FIG. 2 is a view of the outer side of the receiver according to the invention.
Figure 3:
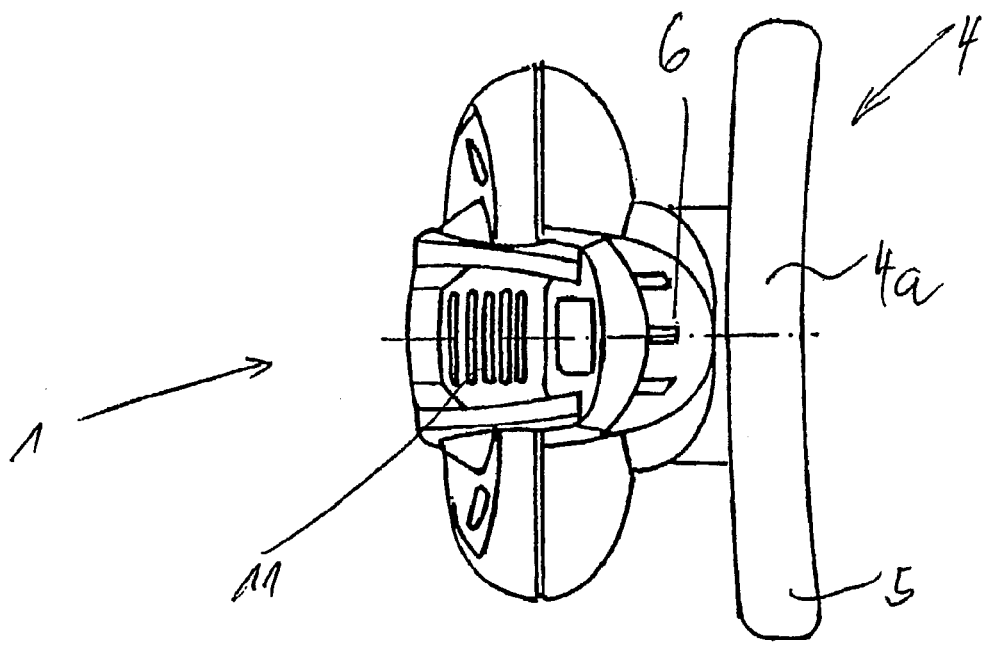
FIG. 3 is a front view of a concrete receiver.
Figure 4:
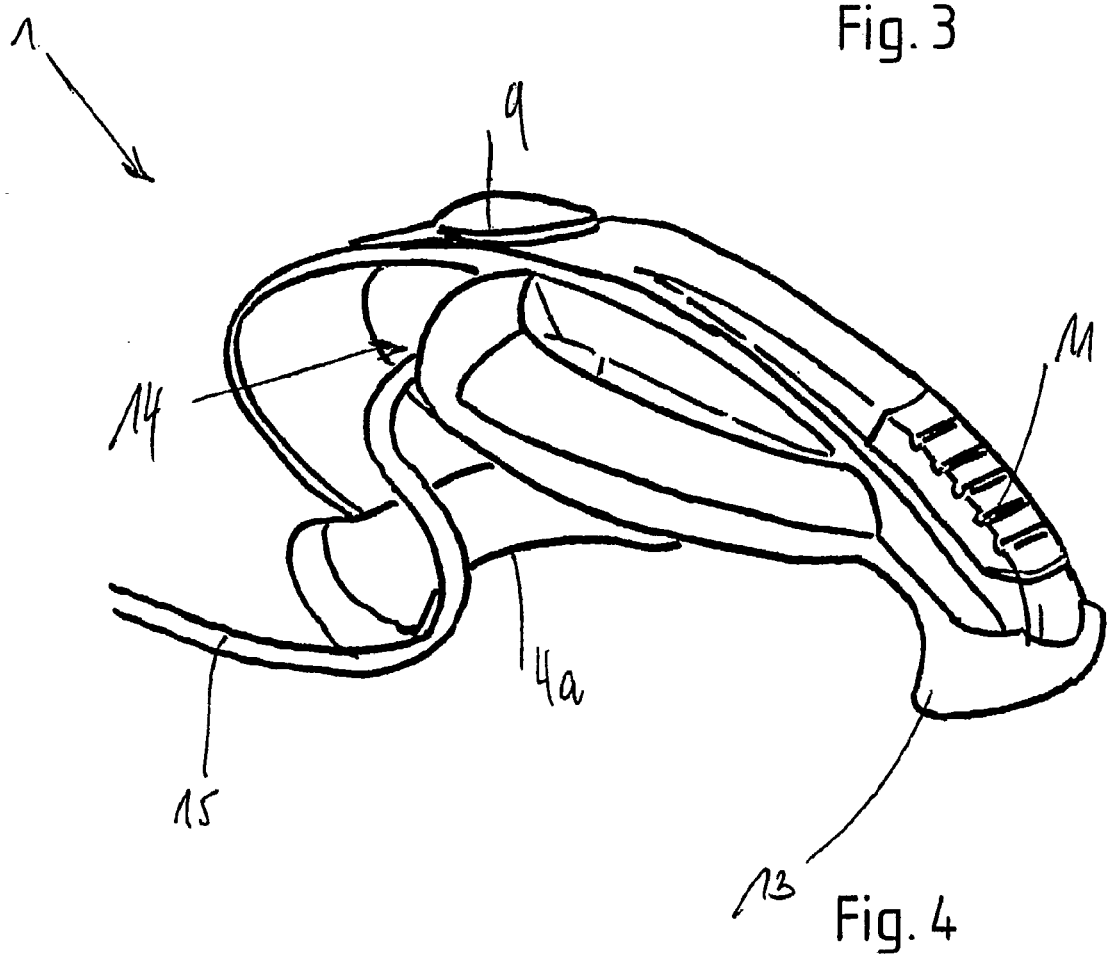
FIG. 4 is a perspective view of the outer side of the receiver in accordance with the invention.
Figure 5:
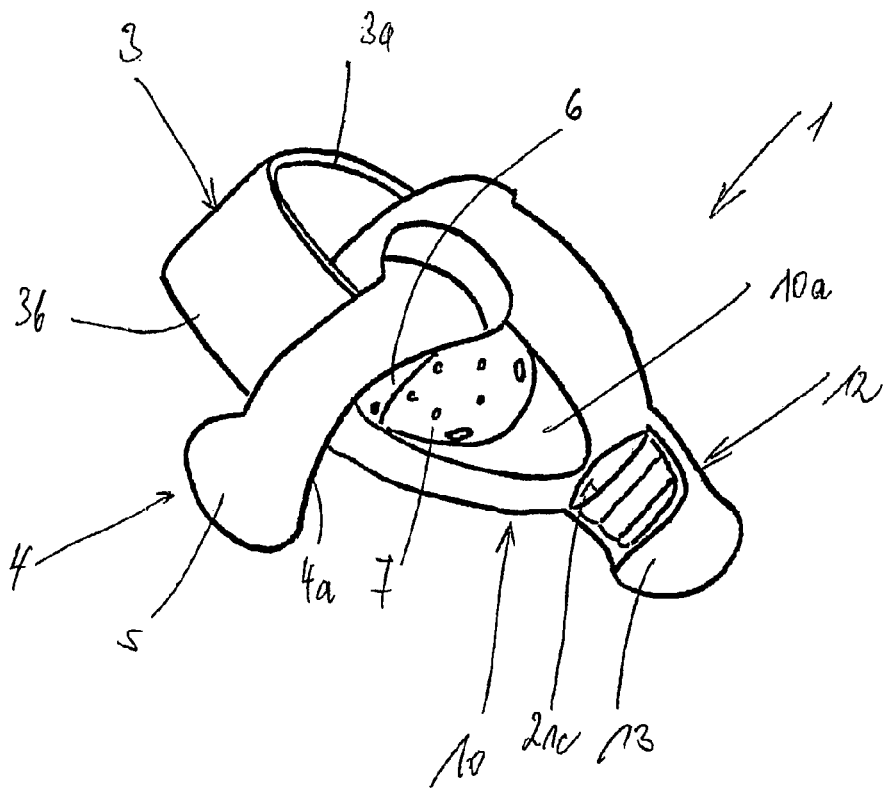
FIG. 5 is a perspective view of the inner side of the receiver in accordance with the invention.
Figure 6:
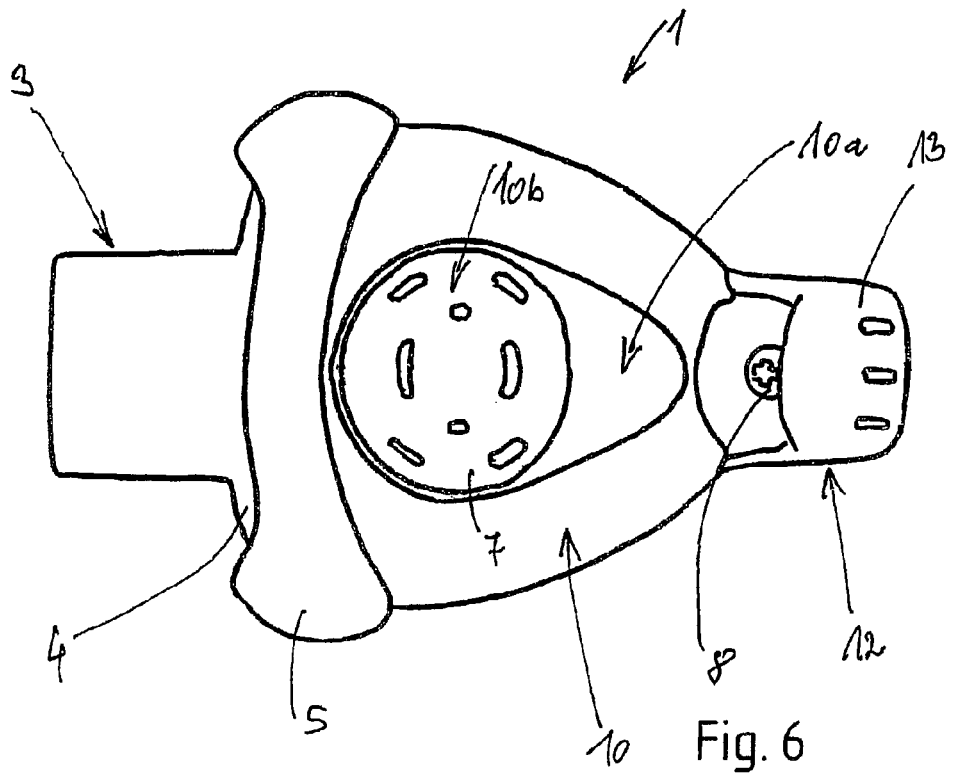
FIG. 6 is a side view of the inner side of the receiver.

The FIGS. 1-7 are different views of an exemplary embodiment of the receiver 1 in accordance with the invention. As will be explained herein after, the receiver shown is provided with a microphone; therefore, it will be mostly referred to herein after as a "headset" without the appended claims being therefore limited to a headset.

The headset 1 is substantially comprised of a housing 2 and of a strap 3 communicating with the housing 2, the strap 3 according to the invention being configured to be elastic or plastic. The side of the housing which is facing a user's ear EAR when fastened is provided with an ear resting area 10. A loudspeaker or an ear piece 7 are accommodated within the housing 2, the ear resting area 10 being provided, in the embodiment shown, with a recess for the loudspeaker 7/the ear piece 7.

Figure 8:
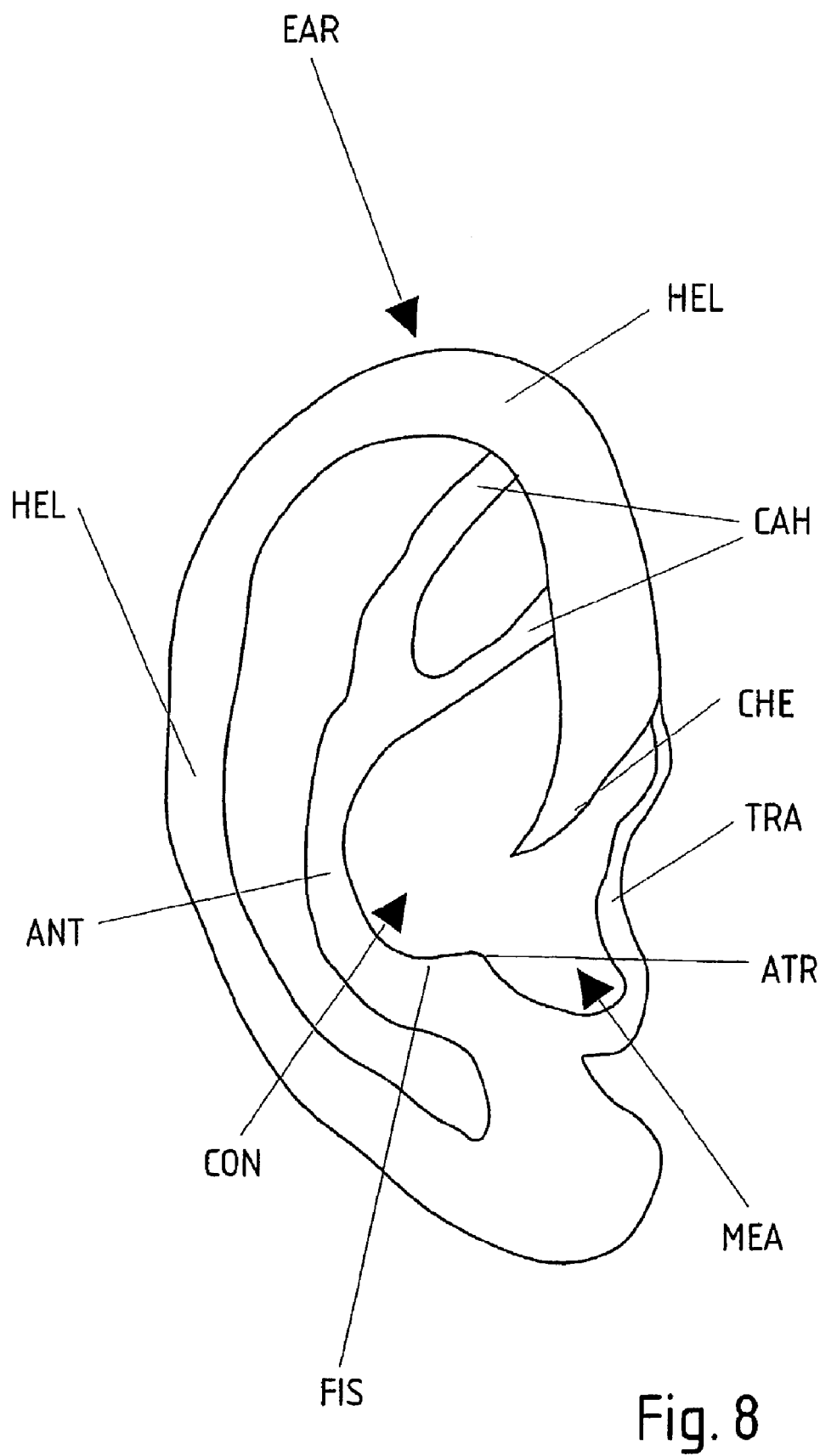
FIG. 8 is a schematic view of a right ear viewed laterally from outside.

For a better understanding of the invention, a right external ear EAR of a user is schematically illustrated in FIG. 8. The parts of the ear EAR that are essential for the invention thereby are the incurving fold that forms the margin of the external ear which is termed Helix HEL, the antihelix ANT and the concha auriculae CON, which is to be referred to herein after as the pinna CON. The pinna CON, which is also often termed "auricle", is a well leading into the exterior auditory canal or into the aperture of the auditory canal MEA (meatus acusticus) that is limited in a rear and upper region thereof by the antihelix ANT and the lower branching CAH (crura anthelicis) of the antihelix, as well as, in a lower region, by the fissura antitragohelicina FIS with the antitragus ATR and, in a front region, by the crus helicia CHE.

As contrasted with many other known headsets, the particular design ensures optimal and stable fit of the headset on the ear of the user without the loudspeaker or the ear piece having to be placed into the exterior auditory canal or into the aperture of the auditory canal MEA, which will be explained in more detail herein after.

As may be surveyed from the FIGS. 1-6, the strap 3 is comprised of two substantial portions 3a, 3b, the one portion 3a extending away from the housing 2 and the second portion 3b being oriented backward toward the housing. In the embodiment shown, the strap 3 is C-shaped, but it may also be configured to be angular for example. When the user wants to put on the headset 1, he simply pulls the deformable strap, more specifically the backward oriented portion 3b thereof, away from the housing 2 so that the backward oriented portion 3b of the strap may conveniently be brought behind the ear so that the backward oriented portion 3b of strap 3 passes behind the ear EAR in a region of the helix HEL thereof. The term deformable is to be construed as the capacity for the strap of experiencing a change in shape to such an extent that it may conform to the shape of a user's ear. The strap may for example be plastically deformable although it is advantageous when it is elastically deformable which will be assumed herein after.

Upon completion of the parting procedure and owing to the elasticity of the strap, the ear resting area 10 of the housing 2 is at least partially pressed against the outer side of the ear EAR and the backward oriented portion 3b of the strap against the back side of the ear. As a result of the quite large surface area of the ear resting area 10 of housing 2, which is pressed against the ear and which extends, in the embodiment shown, beyond the ear piece 7, the pressure exerted by the strap 3 onto various zones at the exterior side of the ear EAR, in the region of the antihelix ANT and/or the helix HEL for example, is distributed in such a manner that the user experiences no discomfort due to a sore ear. The flat configuration of the housing 2 also prevents the headset from being partially pressed into the auditory canal MEA.

The region of the strap portion 3b passing behind the helix HEL is configured in such a manner that it is pressed against the back side of the ear. Thanks to the clamping action of the strap 3, the headset 1 is efficiently prevented from slipping out of place on the ear EAR. In order to further increase hold and wearing comfort, the headset is provided, in the region of area 10, with a prominence 6 with a rounded contour for example. When fastened, the prominence 6 is conveniently disposed in a rear region of area 10 facing the strap 3 so that the prominence 6 projects at least partially into the pinna CON, more specifically in the rear region thereof which is bounded by the antihelix. This prominence 6 reliably prevents the headset held to the ear from slipping in the rearward direction.

The end region of the backward oriented portion 3b of strap 3 additionally abuts on the back side of the ear in the region thereof that is attached to the head. It is thereby advantageous when the portion 3b of strap 3 that passes behind the ear EAR is provided with an adapter 4 having a contour abutting the back side of the ear and conforming to the shape of the back side of the ear. In an advantageous embodiment, said adapter 4, which in the drawing herein is shaped like a sponge finger, is configured integral with the strap 3 and is provided with a soft plastic covering 5, made of rubber for example, in an effort to provide optimal wearing comfort.

Thanks to the adapter 4, the pressure exerted by the strap 3 onto the back side of the ear is hardly noticed, if at all, and the headset is reliably prevented from slipping in an upward or downward direction, which is even further enhanced by the plastic covering 5.

Accordingly, in the embodiment shown, the headset is pressed against the ear by means of the strap; the strap 3, which passes behind the ear and is C-shaped in the present case, prevents the headset from slipping forward, whereas the prominence 6 prevents it from slipping backward. It is prevented from slipping in the upward or downward direction by the pressure of the area 10 of housing 2 exerted against the outer side of the ear on the one hand as well as by the adapter 4 and the prominence 6 on the other hand. In principle though, the mere pressure of the area 10 abutting the outer side of the ear already suffices to create a secure hold of the headset 1 to the ear.

In the embodiment shown, the housing 2 is built symmetrically about a longitudinal axis X. In a side view according to FIG. 2, the housing 2 has an approximately triangular shape with three sides 20a-20c of approximately the same length. The angles 21a-21c of the triangle thereby have a rounded configuration.

Thanks to the symmetrical build of the housing, the headset may be utilized both on the left and on the right ear without the headset having to be manipulated. This construction thus provides an easy way to solve a problem frequently encountered with headsets like for example the one of WO 95/15044. With headsets of the type as described in WO 95/15044, the headset may mostly be worn on one ear only because of the way in which it is to be fastened. It may sometimes be carried on either ear when the loudspeaker is pivotally mounted so that, after rotation of the same, the headset may be used on the other ear. This is not necessary with the present invention and it may be used on either ear without the least problem by simply placing it onto the other ear.

The side 10 of housing 2 which faces the ear has, as already mentioned, a flat configuration and receives the loudspeaker 7 or the ear piece. The surface area may thereby be substantially plane. An exemplary, convenient embodiment of the area 10 may be surveyed from the FIGS. 5 and 6 section, in which the area is curved inward (concave) in an inner region 10a and the inner region has a shape widening in the direction of strap 3. The inner region 10a, which is approximately triangular, is provided with a recess for the loudspeaker or the ear piece 7 and the prominence 6 is substantially configured in the rear region of the inner area 10a facing the strap. The prominence 6 may thereby be integral with the area 10a or the loudspeaker/the ear piece 7 is provided with a corresponding prominence 6.

In the region of its outer border 10b, the area 10 is substantially curved outward, the transition between the regions 10a and 10b of the area 10 being disruptedly formed by an edge. This transition may also be continuous though.

In a front region of the headset 1 there is disposed a microphone 8. Said microphone may thereby be firmly disposed in a receiving location provided on the housing 2. The receiving location may be disposed directly in the housing 2 or, as may be surveyed from the FIGS. 5 or 6 for example, in a projection 12 disposed on the housing 2, on the underside thereof for example. In this arrangement, the microphone 8 is spaced quite a great distance from the user's mouth, more specifically as, in the embodiment shown, the headset 1 hardly extends beyond the ear. However, with the provided microphone quality, this is not a problem with regard to speech quality.

The microphone may also be disposed on a microphone arm 11 which is extendable from a retracted position inside the projection 12 and/or the housing 2 into at least one speaking position by means of a mechanism preferably disposed in the housing 2. The microphone is thereby disposed in a front region, conveniently on a side of the microphone arm that is oriented toward mouth or face, and is not shown in the drawing, more specifically in the FIGS. 1-4 which show a microphone arm 11 in its retracted position.

In principle it is also possible to dispose the microphone 8 on a well known rigid or deformable phone arm of a substantially invariable length. However, this is somehow in contradiction with one of the underlying ideas of the invention which is to provide a quite small headset; although possible, this variant has therefore not been illustrated in the drawing herein.

To support the headset in the region of the user's cheek, it is finally provided, in a front region thereof, in the embodiment shown in the front region of the projection 12, with a supporting surface area 13. This supporting surface area 13 supports the headset 1 directly in front of the ear on the cheek in such a manner that the ear resting area 10 of the headset is not brought into contact with the tragus TRA, a more or less prominent cartilaginous projection at the ear, since this location is quite sensitive to contact and more specifically to pressure.

Figure 7:
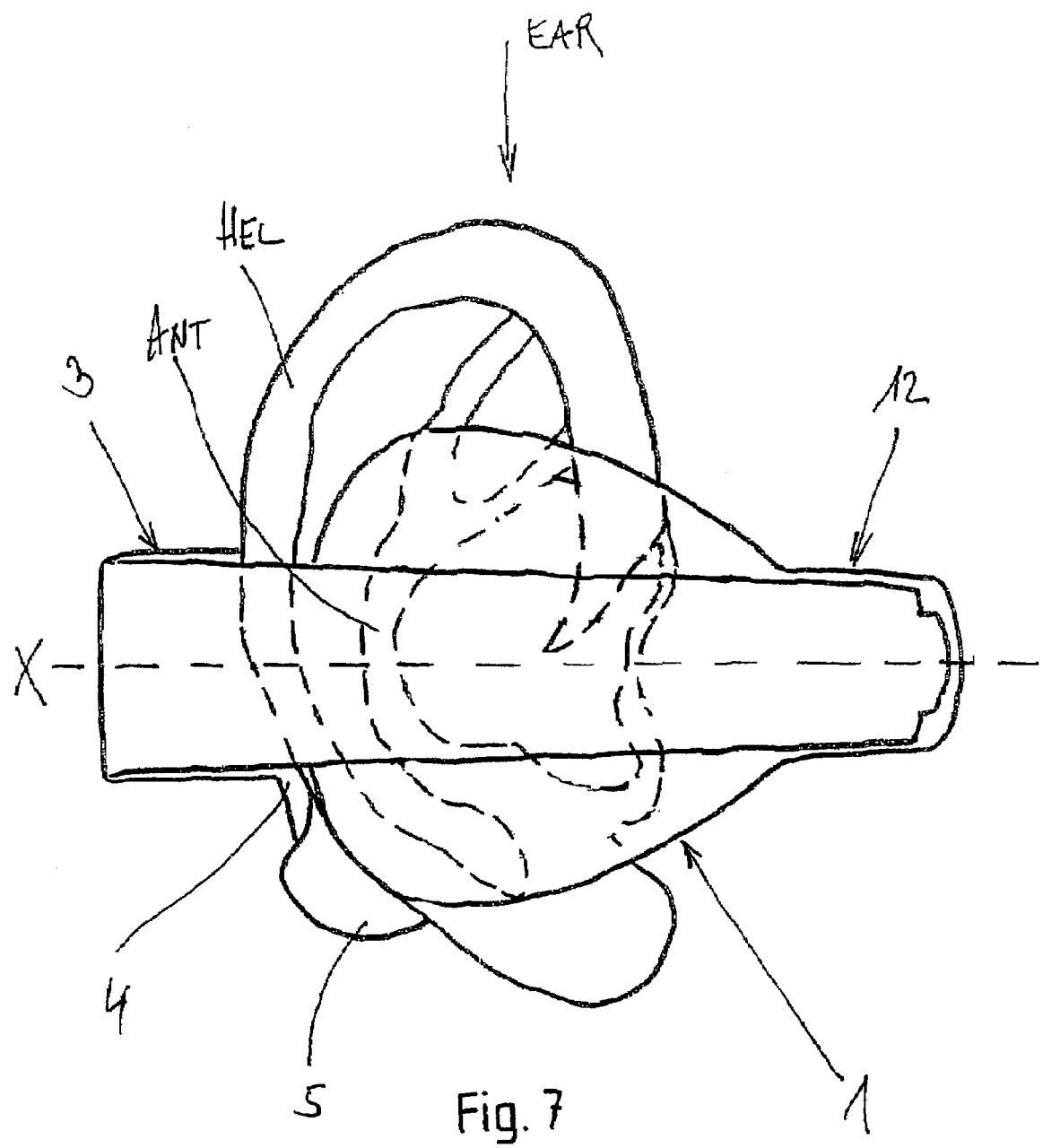
FIG. 7 shows a receiver attached to one ear.

To estimate the approximate size of a headset in accordance with the invention, the reader is referred to FIG. 7 that shows a headset fastened to an ear. The headset adopts hereby a substantially horizontal position relative to its longitudinal axis X—assuming that the user is standing. Depending on the ear shape and the special liking of the user, the headset may also adopt a much more slanted position, the strap 3 passing then behind the ear EAR in a higher region of the helix HEL. As a matter of course, the proportions may also vary, depending for example on the size of the ear.

The embodiments shown have a modular construction. As a result thereof, the upper side, i.e., that side of the housing 2 that is substantially turned away from one ear, the strap 3 with the adapter 4 and the projection 12 in the front region of the headset 1 are configured in one piece in the embodiment of the invention illustrated herein. The housing 2 accommodates the loudspeaker 7 or the ear piece. The housing 2 is closed with a separate cover that is provided, on the side facing the ear, with the already repeatedly mentioned ear resting area 10. In the central region thereof, the cover is provided with a recess adapted to receive the loudspeaker or the ear piece. In the advantageous embodiment shown, the cover extends into the front region of projection 12 on the housing 2 and lines the supporting surface area 13 thereof, which faces the cheek. The cover with the extension covering the supporting surface area is made from a plastics material, from a plastomer like PVC or from an elastomer like rubber for example. Accordingly selecting the material used, the headset comfortably rests on the ear and on the cheek thanks to the softness of the material, a high coefficient of friction furthermore ensuring a firm fit of the receiver at the ear. The cover is simply placed onto the upper part of the housing and may be replaced at need by a new cover. As a result thereof, the component parts of the headset that are prone to wear may be readily exchanged. The plastic parts may also be manufactured in various colours for the purpose of swiftly varying the appearance of the headset. The covering 5 for the adapter 4 is also made from similar materials and in this case as well the covering may be replaced by another one when the need arises.

The upper side of the housing 2 is also provided with an actuation element 9, in the present case configured as a key serving to answer incoming calls by pressing it or to initiate an outgoing call as well. By actuating the key 9, the microphone arm 11 may be extended out of its receiving location or of the housing by way of the mechanism disposed in the housing 2.

The headset is connectable to a device adapted for inputting and/or outputting audio signals via an interface 14 and a cord 15. The connection may be realized by means of a cord for example, but it is also possible to connect the devices via a radio interface complying for example with the well known Bluetooth standard.

To be used as a headset for mobile phones, the headset of the invention is provided with both a loudspeaker and a microphone. The headset may however also be used for the reproduction of audio signals only, meaning as an ear piece only when used in combination with a player for sound carriers such as compact discs or mini discs, or it is intended for use with what are termed MP3 players in which the music is digitally stored as a data file in an electronic memory. The headset shown is also suited for this purpose of utilization although it is then also advisable not to use of a microphone in order to achieve low-cost manufacture and so on.

Further, it should be noted that the light-weighted, comfortable to wear headset of the invention may also be thought of for utilization in telephone exchanges or directory enquiries centers and may also have military applications in cases in which light-weighted and safely worn headsets are needed. As a matter of course, the applications mentioned have been presented for the sake of illustration only and are not intended to be exhaustive.

We claim:

1. A receiver connectable with at least one apparatus adapted to at least output audio signals via at least one interface (14) and provided with at least one ear piece (7) accommodated in a housing (2) and with one retaining strap (3) for releasable attachment to the user's ear (EAR), the retaining strap (3) being disposed on the housing (2) extending away therefrom and a portion (3b) of said retaining strap, which is oriented back toward the housing (2), passing behind the ear (EAR) in a region of the helix (HEL), the region (3b) of the retaining strap (3) passing behind the helix (HEL) being provided with an end region abutting the back side of the ear (EAR) when attached,
wherein
the retaining strap (3) is elastically deformable and
the housing (2) is provided with an ear resting area (10) on a side of the housing that faces the exterior of the ear (EAR),
the elastic retaining strap (3), when fastened, being at least partially pressed against the back side of the ear (EAR) and the ear resting area (10) of the receiver (1) being at least partially pressed against the exterior of the ear (EAR) by the elastic retaining strap (3) in such a manner that the ear piece (7) is disposed in proximity to the pinna (CON) and/or the aperture of the auditory canal (MEA), the ear resting area (10) and the ear piece (7) being held apart from the aperture of the auditory canal (MEA), and the receiver being pressed against the exterior of the ear by the elastic retaining strap (3).

2. The receiver according to claim 1, characterized in that the ear piece (7) has an extension which extends beyond the ear resting area (10).

3. The receiver according to claim 1, characterized in that the strap (3) is C-shaped.

4. The receiver according to claim 1, characterized in that an adapter (4), which is provided with a contour (4a) that abuts on the back side of the ear (EAR), is disposed at that end of the strap (3b) that passes behind the helix (HEL).

5. The receiver according to claim 4, characterized in that the contour (4a) of the adapter (4), which cooperates with the back side of the ear (EAR) substantially conforms to the shape of the ear's back side.

6. The receiver according to claim 4, characterized in that the adapter (4) and the strap (3) are made in one piece.

7. The receiver according to claim 4, characterized in that the adapter (4) is provided with a rubber-like covering.

8. The receiver according claim 1, characterized in that it is provided, in a rear region of the ear resting area (10) facing the strap (3), with a prominence (6) that abuts on a rear region of the pinna (CON) substantially facing the antihelix (ANT) or on that region of the pinna (CON) that merges into the antihelix (ANT) when the receiver (1) is fastened.

9. The receiver according to claim 8, characterized in that the prominence (6) is provided with a substantially rounded contour.

10. The receiver according to claim 8, characterized in that the prominence (6) is configured integral with the ear piece (7).

11. The receiver according to claim 1, characterized by including at least one microphone (8).

12. The receiver according to claim 11, characterized in that the at least one microphone (8) is disposed in a front region of the receiver turned away from the strap (3).

13. The receiver according to claim 11, characterized in that it is provided, in a front region turned away from the strap (3), with an extendable microphone arm (11) receiving, in the front region thereof, the at least one microphone.

14. The receiver according to claim 13, characterized in that the microphone arm (11) is telescopable.

15. The receiver according to claim 1, characterized in that it is provided, in a front region turned away from the ear (EAR), with a supporting surface area (13) for supporting the receiver in a region of the head located immediately in front of the ear (EAR).

16. The receiver according to claim 15, characterized in that the supporting surface area (13) is at least in parts provided with a rubber-like covering.

17. The receiver according to claim 16, characterized in that the cover is made from rubber and the rubber covering for the supporting surface area (13) are made in one piece.

18. The receiver according to claim 1, characterized in that it is configured symmetrical about a longitudinal axis (X).

19. The receiver according to claim 1, characterized in that the housing (2) has a substantially triangular shape viewed from the top/the bottom.

20. The receiver according to claim 19, characterized in that it is shaped like an isosceles or an equilateral triangle.

21. The receiver according to claim 19, characterized in that the sides of the triangle (20a, 20b, 20c) are substantially arcuate.

22. The receiver according to claim 19, characterized by rounded angles.

23. The receiver according to claim 1, characterized in that an actuation element (9) for answering and/or making calls is provided on the side turned away from the ear (EAR).

24. The receiver according to claim 23, characterized in that the actuation element (9) is connected to the extendable microphone arm (11) through a mechanism disposed within the housing in such a manner that the arm (11) is moved from its retracted into an extended position upon actuation of said element (9).

25. The receiver according to claim 1, characterized in that the ear resting area (10) is configured as a cover for the underside of the housing and is releasably fastenable thereon.

26. The receiver according to claim 25, characterized in that the cover is made from a rubber-like material.

* * * * *